US008504458B1

(12) United States Patent
Lai et al.

(10) Patent No.: US 8,504,458 B1
(45) Date of Patent: Aug. 6, 2013

(54) INVESTMENT STRATEGY SYSTEM

(75) Inventors: Aaron Lai, Alameda, CA (US);
Debashis Ghosh, Charlotte, NC (US);
David Joa, Irvine, CA (US); **Kurt
Newman, Matthews, NC (US); Thayer
Allison, Charlotte, NC (US); Sudeshna
Banerjee**, Waxhaw, NC (US)

(73) Assignee: Bank of America Corporation,
Charlotte, NC (US)

( * ) Notice: Subject to any disclaimer, the term of this
patent is extended or adjusted under 35
U.S.C. 154(b) by 369 days.

(21) Appl. No.: 12/413,326

(22) Filed: Mar. 27, 2009

(51) Int. Cl.
*G06Q 40/00* (2012.01)
(52) U.S. Cl.
USPC ........................................ 705/36 R
(58) Field of Classification Search
USPC ........................................ 705/36 R
See application file for complete search history.

(56) References Cited

U.S. PATENT DOCUMENTS

| | | | |
|---|---|---|---|
| 6,564,191 B1 * | 5/2003 | Reddy | 705/36 R |
| 6,983,260 B2 | 1/2006 | Hummelgren | |
| 7,346,520 B2 | 3/2008 | Etzioni et al. | |
| 7,349,878 B1 * | 3/2008 | Makivic | 705/37 |
| 2005/0015323 A1 * | 1/2005 | Myr | 705/37 |
| 2008/0208767 A1 * | 8/2008 | Murray | 705/36 R |
| 2009/0063236 A1 * | 3/2009 | Pennay | 705/8 |

OTHER PUBLICATIONS

Pfister, Alexander, "Heterogeneous Trade Intervals in an Agent Based Financial Market", Working Paper Series, Working Paper No. 99, pp. 1-19, Oct. 2003—http://www.wu-wien.ac.at/am/Download/wp99.pdf.
Umarov, Rashid, "Mathematics in Trading: How to Estimate Trade Results", Automated Championship 2007, pp. 1-13; http://championship.mq14.com/2007/news/203.

* cited by examiner

*Primary Examiner* — Hani M Kazimi
*Assistant Examiner* — Hatem M Ali
(74) *Attorney, Agent, or Firm* — Michael A. Springs; Moore & Van Allen PLLC; Padowithz Alce

(57) ABSTRACT

Embodiments of the present invention relate to apparatuses, systems, methods, and computer program products for determining an investment strategy for a security. In one embodiment, an apparatus comprises a processor configured to: (1) receive information identifying a security; (2) access historical market data for the security, wherein the historical market data includes historical values, over a historical period of time, for one or more market parameters for the security; (3) use the historical market data to determine a relationship between a market parameter's value and the security's value during the historical period of time; and (4) use the relationship to determine an investment strategy that determines trading decisions based at least partially on the market parameter's value.

28 Claims, 6 Drawing Sheets

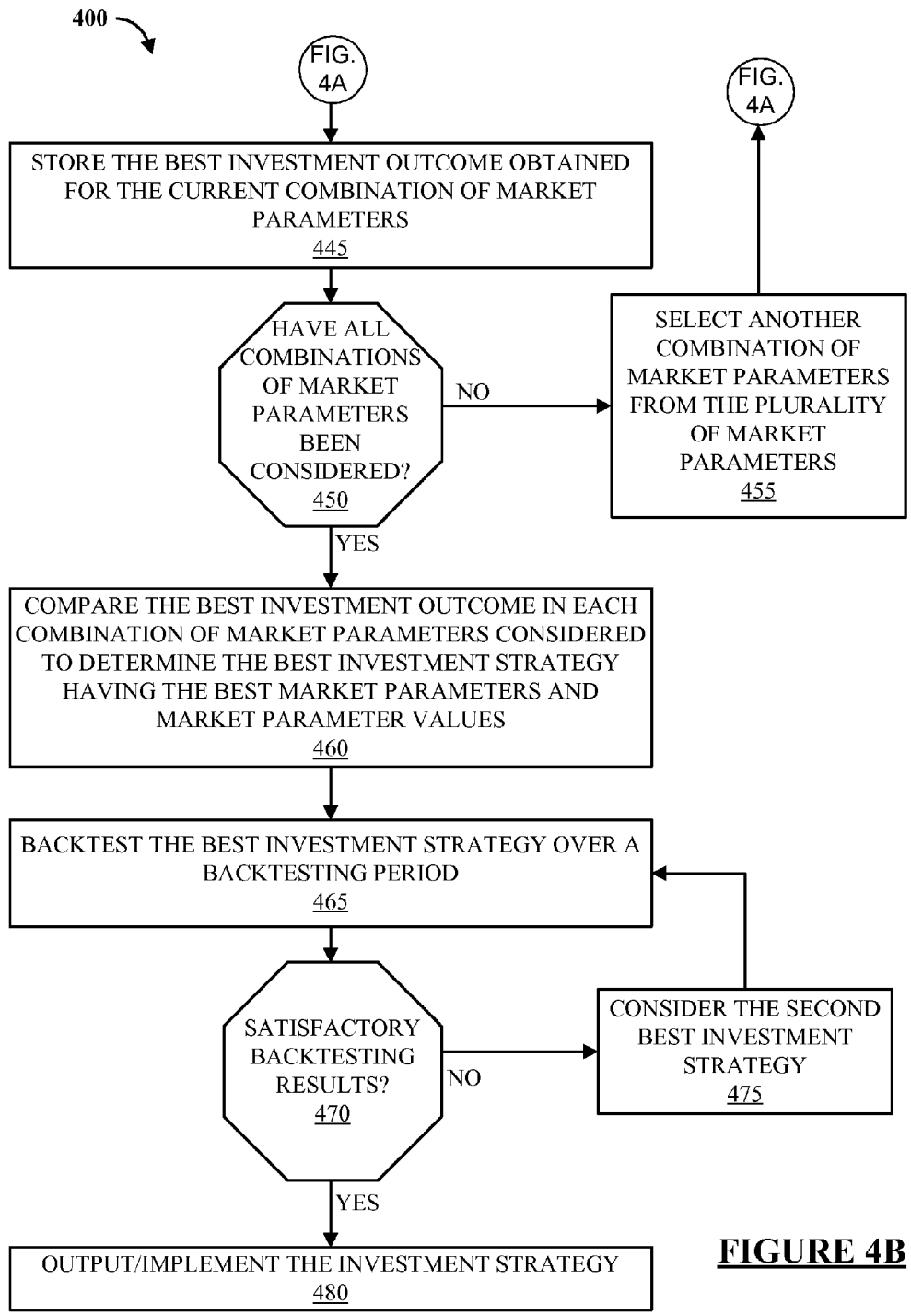

INVESTMENT STRATEGY SYSTEM

FIELD

In general, embodiments of the present invention relate to apparatuses, systems, methods, and computer program products for determining an investment strategy for a security.

BACKGROUND

Many investors believe that the market price of a security (or group of securities) moves in non-random patterns and that these patterns may be identified and exploited. As a result, investors spend significant amounts of time and money pouring over market data for the security in an attempt to identify meaningful price patterns and how and/or why they are triggered. However, this task is not easy, and many investors do not have the requisite time or money to spend doing this level of research. Accordingly, it would be desirable if there were something to make this process easier and/or less expensive. In particular, it would be desirable if there were an apparatus, system, method, and/or computer program product configured to review market data for a security, make predictions about the direction in which the market price of the security is headed, and instruct a user how to invest in the security.

SUMMARY OF SELECTED EMBODIMENTS OF THE INVENTION

Embodiments of the present invention relate to apparatuses, systems, methods, and computer program products for determining an investment strategy for a security. For example, in one embodiment of the present invention, an apparatus is provided that comprises a processor configured to: (1) receive information identifying a security; (2) access historical market data for the security, where the historical market data includes historical values, over a historical period of time, for one or more market parameters for the security; (3) use the historical market data to determine a relationship between a market parameter's value and the security's value during the historical period of time; and (4) use the relationship to determine an investment strategy that determines trading decisions based at least partially on the market parameter's value.

In one embodiment, the apparatus further comprises an input device configured to receive the information identifying the security from a user. In another embodiment, the apparatus further comprises a memory device having the historical market data for the security stored therein. In another embodiment, the apparatus further comprises a communication device configured to access, via a network, the historical market data stored on another device.

In one embodiment, the security comprises a stock or a combination of stocks. In another embodiment, the processor is further configured to use the investment strategy to initiate one or more trades involving the security. In another embodiment, the apparatus further comprises a communication device, where the processor is further configured to use the investment strategy to periodically output, via the communication device, one or more trade recommendations involving the security to a user.

In one embodiment, the historical market data includes historical values for a plurality of market parameters for the security during the historical period of time, and the processor is further configured to: (1) select a first combination of market parameters from the plurality of market parameters; (2) determine a first investment strategy that determines trading decisions based at least partially on values of the first combination of market parameters; (3) test the first investment strategy over a historical period of time and determine a first investment outcome resulting from the test; (4) select a second combination of market parameters from the plurality of market parameters, where the second combination of market parameters is different than the first combination of market parameters; (5) determine a second investment strategy that determines trading decisions based at least partially on values of the second combination of market parameters; (6) test the second investment strategy over the historical period of time and determine a second investment outcome resulting from the test; and (7) select the first combination of market parameters or the second combination of market parameters based at least partially on a comparison between the first investment outcome and the second investment outcome.

In another embodiment, the historical market data includes historical values for one or more market parameters for the security during the historical period of time, and the processor is further configured to: (1) select one or more market parameters; (2) determine a first investment strategy that determines trading decisions based at least partially on a first set of values for the selected one or more market parameters; (3) test the first investment strategy over a historical period of time and determine a first investment outcome resulting from the test; (4) determine a second investment strategy that determines trading decisions based at least partially on a second set of values for the selected one or more market parameters, where the second set of values is different than the first set of values; (5) test the second investment strategy over the historical period of time and determine a second investment outcome resulting from the test; (6) compare the first investment outcome to the second investment outcome; and (7) determine, based at least partially on the comparison of the first investment outcome to the second investment outcome, a third investment strategy that determines trading decisions based at least partially on a third set of values for the selected one or more market parameters, where the third set of values is different than the first set of values and the second set of values.

In another embodiment, the processor is further configured to: (1) determine a set of one or more values for each of one or more market parameters based at least partially on the relationship between the market parameter's value and the security's value during the historical period of time; (2) receive an indication of the value of each of the one or more market parameters during a first period of time; (3) determine whether the value of each of the one or more market parameters during the first period of time falls within the set of one or more values for each of the one or more market parameters; and (4) determine whether to buy or sell the security during a second period of time based at least partially on the determination of whether the value of each of the one or more market parameters during the first period of time falls within the set of one or more values for each of the one or more market parameters.

In another embodiment, the processor is further configured to: (1) receive a loss tolerance defining a maximum acceptable loss at any given time; and (2) use the loss tolerance to determine an investment strategy that does not, at any time during a defined historical period of time, lose more than the maximum acceptable loss defined by the loss tolerance. In another embodiment, the apparatus further comprises a communication device, where the processor is configured to receive, via the communication device, an indication of the loss tolerance provided by a user. In another embodiment, the processor is further configured to test the investment strategy over a backtesting period that is different in time than the historical period of time. In still another embodiment, the market parameter comprises at least one of the uniform close, uniform difference, daily close, gap up, or gap down for the security.

In one embodiment of the present invention, an apparatus is provided that comprises a memory having a first predefined rule and a second predefined rule stored therein, and a processor operatively connected to the memory and configured to determine an investment strategy that determines values for one or more market parameters during a first period of time, determines that an investment should be purchased when the values for the one or more market parameters satisfy the first predefined rule, and determines that the investment should be sold when the one or more market parameters satisfies the second predefined rule. In another embodiment, the investment strategy involves using all of a defined sum of money to purchase the investment when the first predefined rule is satisfied, and selling the entire investment when the second predefined rule is satisfied. In yet another embodiment, the second predefined rule is the negative of the first predefined rule.

In one embodiment of the present invention, a method for determining an investment strategy for a security is provided comprising: (1) accessing historical market data for the security, where the historical market data is stored in a memory, and where the historical market data includes historical values, over a historical period of time, for one or more market parameters for the security; (2) using a processor and the historical market data to determine a relationship between a market parameter's value and the security's value during the historical period of time; and (3) using the relationship to determine the investment strategy, where the investment strategy determines trading decisions based at least partially on the market parameter's value.

In another embodiment, the method further comprises receiving information identifying the security from a user. In another embodiment, the security comprises a stock or a combination of stocks. In still another embodiment, the method further comprises using the investment strategy to automatically initiate one or more electronic trades involving the security. In yet another embodiment, the method further comprises using the investment strategy to periodically display, using an output device, one or more trade recommendations involving the security to a user.

In one embodiment, the historical market data includes historical values for a plurality of market parameters for the security during the historical period of time, and the method further comprises: (1) selecting a first combination of market parameters from the plurality of market parameters; (2) determining a first investment strategy that determines trading decisions based at least partially on values of the first combination of market parameters; (3) using a processor to test the first investment strategy over a historical period of time and determine a first investment outcome resulting from the test; (4) selecting a second combination of market parameters from the plurality of market parameters, where the second combination of market parameters is different than the first combination of market parameters; (5) determining a second investment strategy that determines trading decisions based at least partially on values of the second combination of market parameters; (6) using a processor to test the second investment strategy over the historical period of time and determine a second investment outcome resulting from the test; and (7) selecting the first combination of market parameters or the second combination of market parameters based at least partially on a comparison between the first investment outcome and the second investment outcome.

In one embodiment, the historical market data includes historical values for one or more market parameters for the security during the historical period of time, and the method further comprises: (1) selecting one or more market parameters; (2) determining a first investment strategy that determines trading decisions based at least partially on a first set of values for the selected one or more market parameters; (3) using a processor to test the first investment strategy over a historical period of time and determine a first investment outcome resulting from the test; (4) determining a second investment strategy that determines trading decisions based at least partially on a second set of values for the selected one or more market parameters, where the second set of values is different than the first set of values; (5) using a processor to test the second investment strategy over the historical period of time and determine a second investment outcome resulting from the test; (6) using a processor to compare the first investment outcome to the second investment outcome; and (7) using a processor to determine, based at least partially on the comparison of the first investment outcome to the second investment outcome, a third investment strategy that determines trading decisions based at least partially on a third set of values for the selected one or more market parameters, where the third set of values is different than the first set of values and the second set of values.

In another embodiment, the method further comprises: (1) using a processor to determine a set of one or more values for each of one or more market parameters based at least partially on the relationship between the market parameter's value and the security's value during the historical period of time; (2) receiving an indication of the value of each of the one or more market parameters during a first period of time; (3) determining whether the value of each of the one or more market parameters during the first period of time falls within the set of one or more values for each of the one or more market parameters; and (4) determining whether to buy or sell the security during a second period of time based at least partially on the determination of whether the value of each of the one or more market parameters during the first period of time falls within the set of one or more values for each of the one or more market parameters. In another embodiment, the method further comprises providing a loss tolerance defining a maximum acceptable loss at any given time, and using a processor and the loss tolerance to determine an investment strategy that does not, at any time during a defined historical period of time, lose more than the maximum acceptable loss defined by the loss tolerance.

In one embodiment of the present invention, a method implemented by a computerized apparatus configured for determining an investment strategy for a security is provided, the method comprising: (1) determining a first investment strategy and a second investment strategy for the security, where the first investment strategy is based at least partially on a first market parameter value for the security, and where the second investment strategy is based at least partially on a second market parameter value for the security; (2) determining a first investment outcome for the first investment strategy based on historical market data for the security over an optimization period; (3) determining a second investment outcome for the second investment strategy based on the historical market data for the security over the optimization period; (4) storing the first investment strategy, second investment strategy, first investment outcome, and second investment outcome in memory; and (5) determining a third investment strategy for the security, where the third investment strategy is based at least partially on a third market parameter value for the security, and where the third market parameter value is determined based at least partially on a comparison of the first market parameter value and the first investment outcome to the second market parameter value and the second investment outcome.

In another embodiment, (1) the determining the first investment outcome for the first investment strategy further comprises representing the first investment strategy as a first set of coordinates based at least partially on the first market parameter value and the first investment outcome; (2) the determining the second investment outcome for the second investment strategy further comprises representing the second investment strategy as a second set of coordinates based at least partially on the second market parameter value and the second investment outcome; and (3) the determining the third investment strategy for the security further comprises determining the third investment strategy based at least partially on a vector between the first set of coordinates and the second set of coordinates. In another embodiment, the first market parameter value, second market parameter value, and third market parameter value relate to at least one of the uniform close, uniform difference, daily close, gap up, and gap down for the security.

In one embodiment of the present invention, a computer program product for determining an investment strategy for a security is provided, where the computer program product comprises a computer-readable storage medium having computer-executable program code stored therein. In one embodiment, the computer-executable program code comprises: (1) a first executable code portion configured to determine a first investment strategy and a second investment strategy for the security, where the first investment strategy relates to a first market parameter value for the security, and where the second investment strategy relates to a second market parameter value for the security; (2) a second executable code portion configured to determine a first investment outcome for the first investment strategy and a second investment outcome for the second investment strategy; and (3) a third executable code portion configured to determine a third investment strategy for the security, where the third investment strategy relates to a third market parameter value for the security, and where the third investment strategy is based at least partially on a comparison of the first market parameter value and the first investment outcome to the second market parameter value and the second investment outcome. In another embodiment, the first executable code portion is further configured to randomly determine at least one of the first market parameter value and second market parameter value.

BRIEF DESCRIPTION OF THE DRAWINGS

Figure 1:
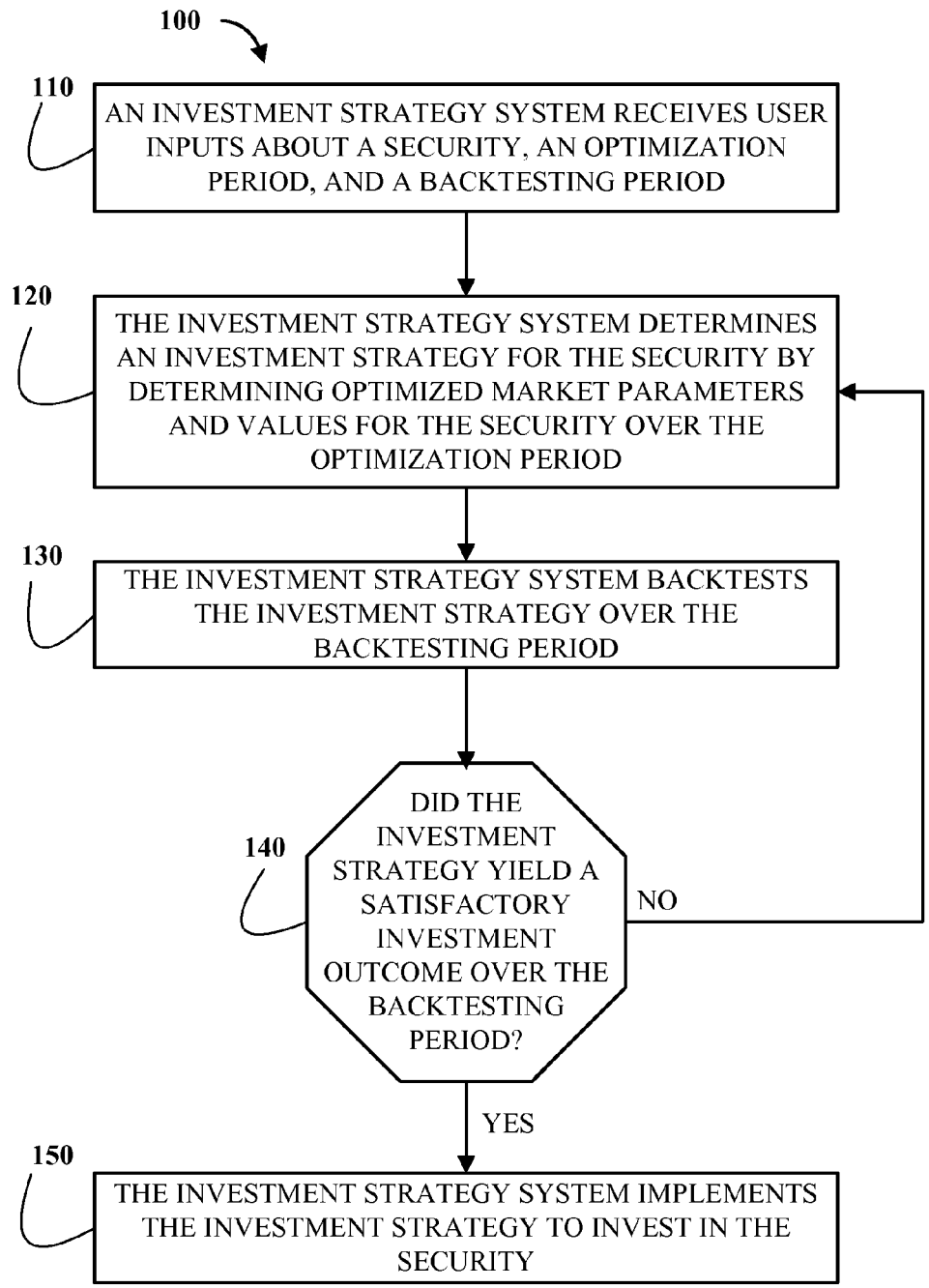
Figure 2A:
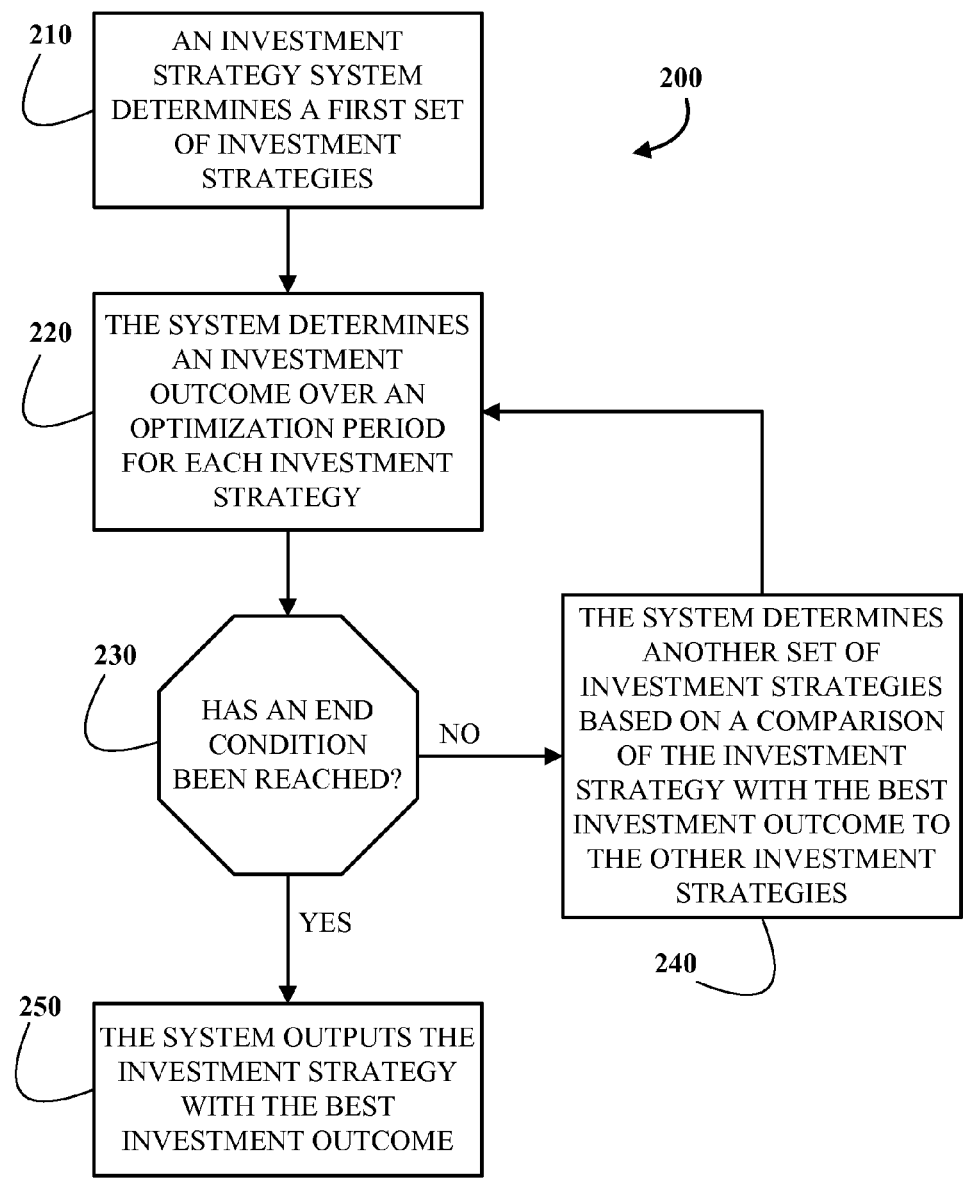
Figure 2B:
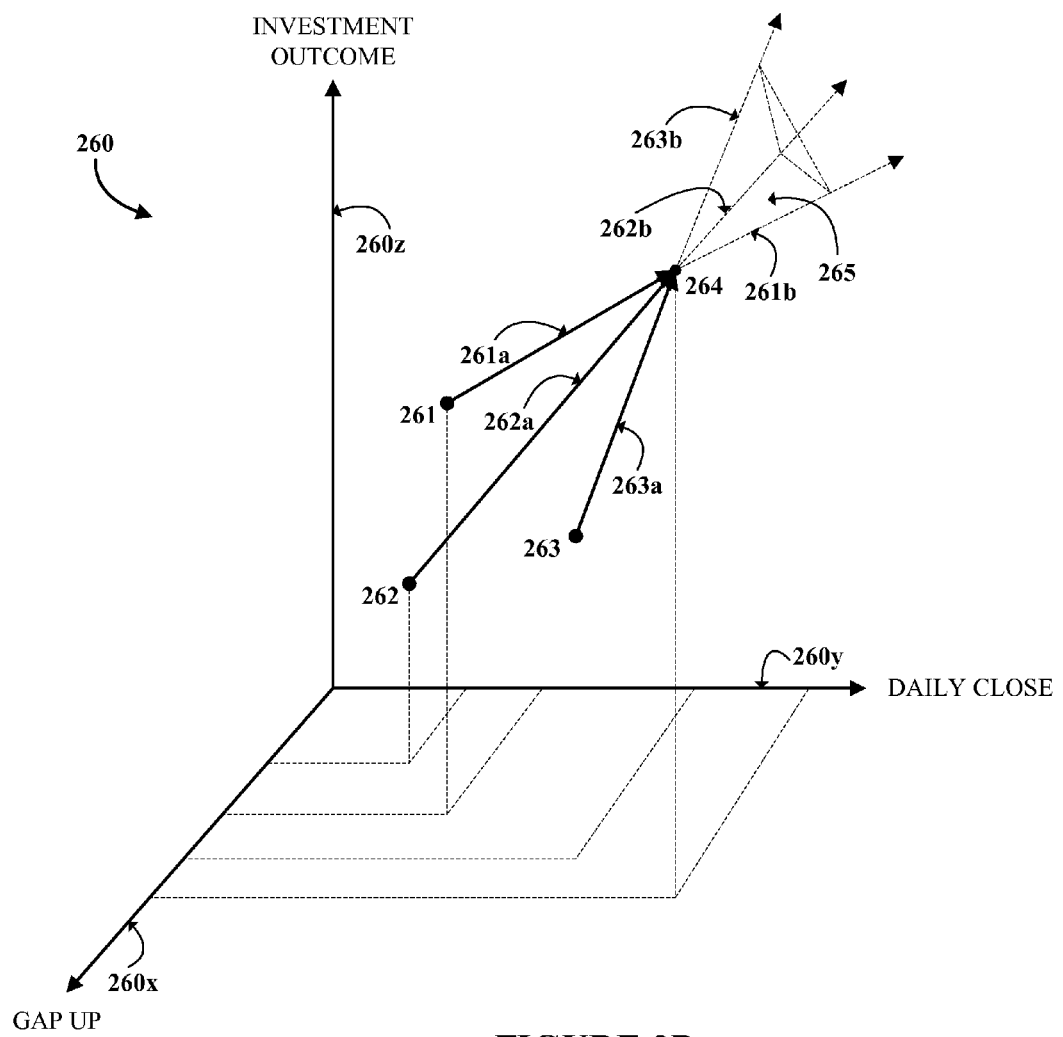
Figure 3:
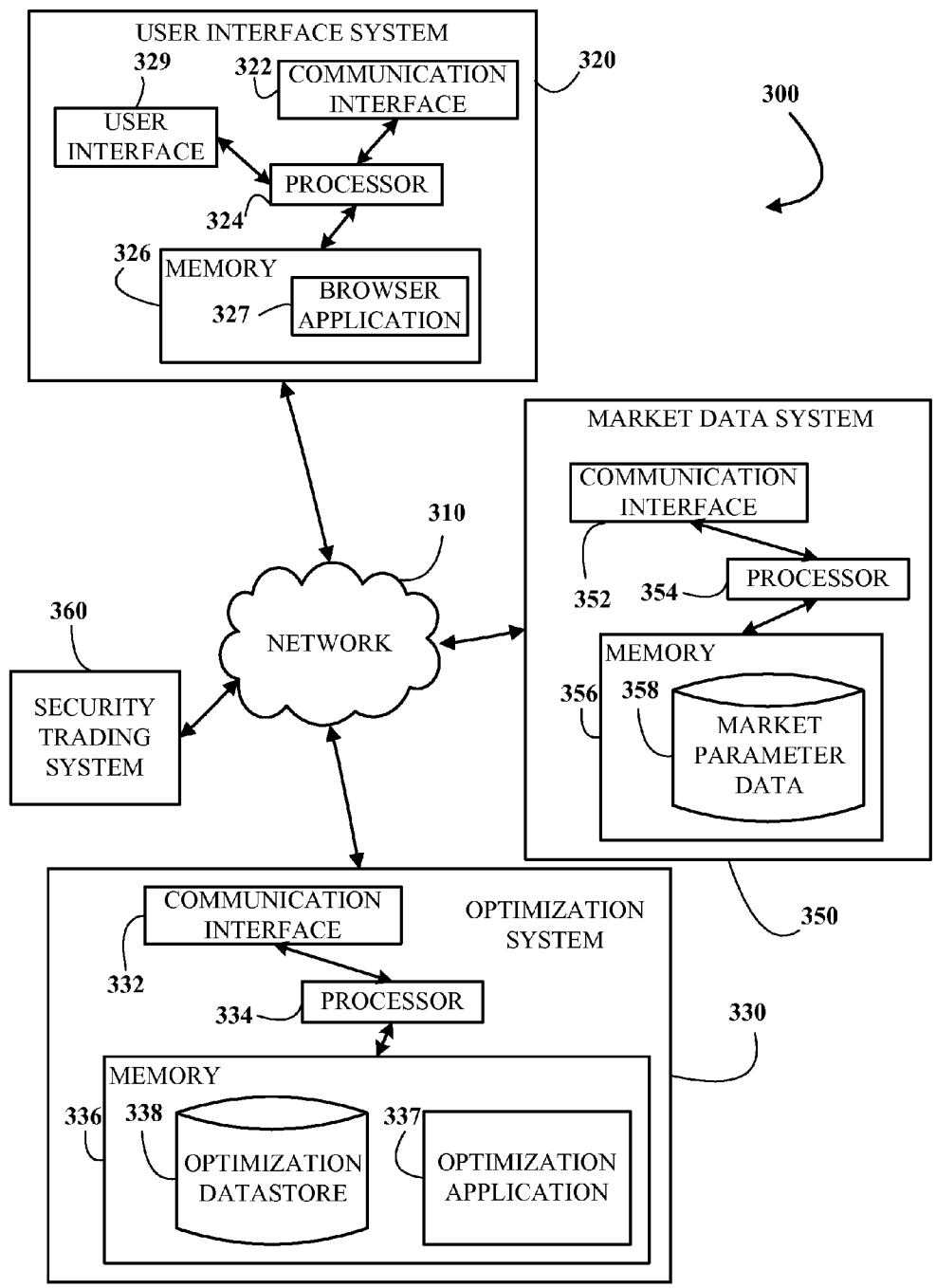
Figure 4A:
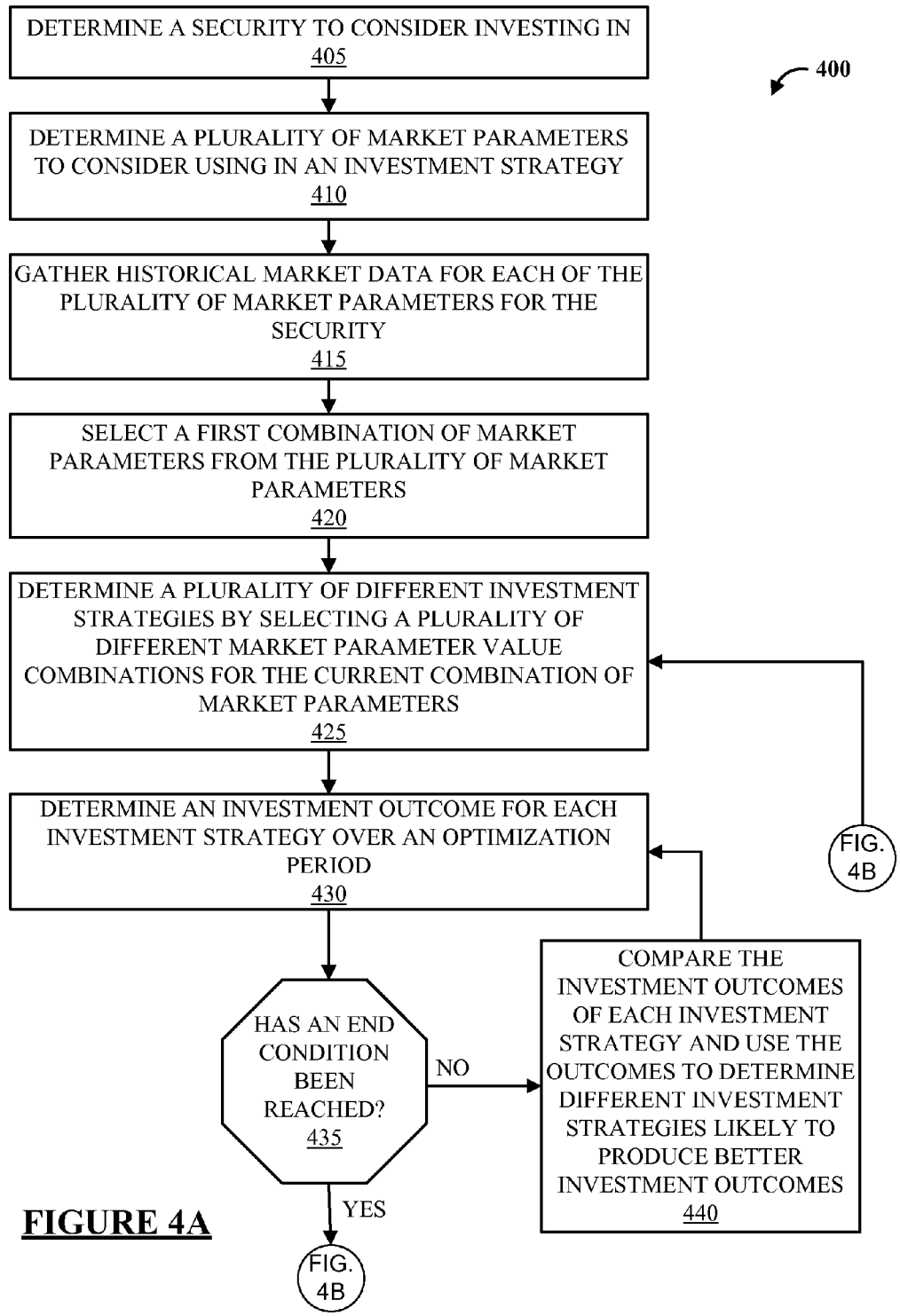

Having thus described embodiments of the invention in general terms, reference will now be made to the accompanying drawings, which are not necessarily drawn to scale, and wherein:

FIG. 1 is a flow diagram illustrating a general process flow of an investment strategy system, in accordance with an embodiment of the present invention;

FIG. 2A is a flow diagram illustrating a general process flow of an optimization process for an investment strategy system, in accordance with an embodiment of the present invention;

FIG. 2B is a three-dimensional coordinate system representing one method of determining an investment strategy, in accordance with one embodiment of the present invention;

FIG. 3 is a block diagram illustrating technical components of an investment strategy system, in accordance with an embodiment of the present invention; and FIGS. 4A and 4B are flow diagrams illustrating a general process flow of an investment strategy system, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, device, computer program product, or any other apparatus), method (including, for example, a business process, computer-implemented process, or any other process), and/or any combination of the foregoing. Accordingly, embodiments of the present invention may take the form of an entirely software embodiment (including firmware, resident software, microcode, etc.), an entirely hardware embodiment, or an embodiment combining software and hardware aspects that may generally be referred to herein as a "system." Furthermore, embodiments of the present invention may take the form of a computer program product having a computer-readable storage medium having computer-executable program code embodied in the medium.

Any suitable computer-readable medium may be utilized. The computer-readable medium may be, for example but not limited to, an electronic, magnetic, optical, electromagnetic, infrared, or semiconductor system, apparatus, or device. For example, in one embodiment, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or other tangible optical or magnetic storage device.

Computer-executable program code for carrying out operations of the present invention may be written in object oriented, scripted and/or unscripted programming languages such as Java, Perl, Smalltalk, C++, SAS, SQL, or the like. However, the computer-executable program code portions for carrying out operations of the invention may also be written in conventional procedural programming languages, such as the "C" programming language or similar programming languages.

Embodiments of the present invention are described below with reference to flowchart illustrations and/or block diagrams of systems, methods, and computer program products according to embodiments of the invention. It will be understood that each block having the flowchart illustrations and/or block diagrams, and combinations of blocks in the flowchart illustrations and/or block diagrams, may be implemented by computer-executable program code. The computer-executable program code may be provided to a processor of a general purpose computer, special purpose computer, or other programmable data processing apparatus to produce a particular machine, such that the computer-executable program code portions, which execute via the processor of the computer or other programmable data processing apparatus, create mechanisms for implementing the functions/acts specified in the flowchart and/or block diagram block(s).

The computer-executable program code may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the computer-executable program code which executes on the computer or other programmable apparatus provides steps for implementing the functions/acts specified in the flowchart and/or block diagram block(s). Alternatively, computer-implemented steps or acts may be combined with operator or human implemented steps or acts in order to carry out an embodiment of the invention.

It will be understood that the term "security," as used herein, refers to any one or more goods, services, and/or financial instruments that may be publicly or privately traded. Securities may include any common stocks, bonds, indexes, option contracts, commodities, mutual funds, exchange traded funds (ETFs), currencies, American Depository Receipts (ADRs), annuities, closed-end investment funds, collectibles, convertible securities, corporate bonds, futures contracts, life insurance, money market funds, mortgage-backed securities, municipal bonds, preferred stocks, real estate, personal property, real estate investment trusts (REITs), treasuries, unit investment trusts (UITs), zero-coupon securities, and groups and/or combinations of the foregoing or other investment vehicles or assets.

It will also be understood that the phrase "market parameter," as used herein, refers to any one or more forms of market data that can be tracked for a security, including, for example, the trading date, daily open, daily close, daily high, daily low, daily volume, adjusted close, percent volume, uniform open, uniform close, uniform difference, gap up, gap down, gap as a percentage of adjusted close, daily percent gain, change in security price from daily open, daily close from the previous day, bid price, ask price, trading day range, fifty-two week range, average volume over past three months, market capitalization, price to earnings ratio, earnings per share, interest rate, dividend yield, and/or the like. Other exemplary market parameters may include simple moving averages, exponential moving averages, Bollinger Bands, money flow indices, MACD (moving average convergence/divergence), parabolic SAR ("stop and reversal"), rate of change, relative strength index, slow stochastics, fast stochastics, stochastic oscillators, "Williams % R," and/or the like. It will be understood that any combination or derivation of any of the foregoing market parameters, such as, for example, rates of change, also comprise market parameters. The historical values of these and other market parameters for a security are commonly available on popular finance websites.

Some of the market parameters mentioned most frequently herein are listed and described in Table 1 below:

TABLE 1

Exemplary Market Parameters

| Market Parameter Name | Description |
|---|---|
| Daily Open | The price of the security when the market opened |
| Daily High | The highest price of the security during the trading day |
| Daily Low | The lowest price of the security during the trading day |
| Daily Close | The last price of the security before the market closed |
| Daily Volume | The number of shares of the security traded during the trading day |
| Adjusted Close | The daily close adjusted for splits and/or dividends paid out |
| Percent Volume | The percent increase/decrease in trading volume relative to the previous trading day |
| Uniform Open | The daily open calibrated between 1 (daily low) and 100 (daily high) |
| Uniform Close | The daily close calibrated between 1 (daily low) and 100 (daily high) |
| Uniform Difference | The uniform close minus the uniform open |
| Gap Up | The break between prices that occurs when the price of the security makes a sharp move up |
| Gap Down | The break between prices that occurs when the price of the security makes a sharp move down |
| Gap as a Percentage of Adjusted Close | The size of the gap up or down as a percentage of the adjusted close |
| Daily Percent Gain | The percentage gain (or loss) since the last trading day |

In general terms, embodiments of the present invention are directed to apparatuses, systems, methods, and computer program products for determining an investment strategy for a security. In many of the embodiments described herein, these strategies are based at least partially on value(s) for market parameter(s) that relate to assumption(s) about how the price of a security moves. For example, in one embodiment, it may be assumed that if Index A closes at a price near its daily high, and volume is increasing, then it is likely that the price of Index A will continue to rise on the following trading day. Accordingly, a strategy for investing in Index A may be based at least partially on the market parameters values of Index A that relate to this assumption, such as, for example, a uniform close market parameter value greater than 90 and a percent volume market parameter value greater than zero. Of course, it will be understood that other embodiments of the present invention may be based on other assumptions and/or use more or less and/or different market parameters and market parameter values for determining an investment strategy. As used herein, for simplicity, it will be understood that the terms "value" or "values," such as when referring to "market parameter value," may include any set of values, including, for example, one value, a range of values, a plurality of values, no value, all values, etc.

It will also be understood that one security may have different historical trading patterns than another security. For example, the price movement for stocks may relate to different market parameter(s) (and/or market parameter value(s)) than the price movement for bonds. It will also be understood that each market parameter for any given security may not be equally reliable in predicting the price movement of the security. For example, historical market data for Stock A may show that the price of Stock A typically increases after a trading day where the daily close was less than $10 per share, regardless of whether there was a gap down during that trading day.

Accordingly, many embodiments of the present invention are configured to determine (sometimes referred to herein as "test") whether a relationship exists between one or more market parameters of a security and the price movement of the security. Where a relationship is found to exist, many embodiments of the present invention are also configured to determine (sometimes referred to herein as "test") the nature of that relationship. In one embodiment, this involves determining or testing how historical market parameter value(s) of a security affect the historical price movement of the security. It will be understood that some embodiments of the present invention are configured to determine the nature of relationships only over a finite number of past trading days, called an "optimization period." Those market parameter(s) that most directly relate to the price movement of a security over a particular optimization period, as determined by an embodiment of the present invention, are referred to herein as "optimized" market parameter(s). Similarly, those market parameter value(s) that most directly relate to the price movement of a security over a particular optimization period, as determined by an embodiment of the present invention, are referred to herein as "optimized" market parameter value(s). It will be understood that the relationship(s) between historical market parameter(s) and/or value(s) and the historical price movement of the security may be determined to be any kind of known relationship, including, for example, a causal relationship, correlative relationship, linear relationship, parabolic relationship, etc. For example, in one embodiment, it may be determined that an increase in the uniform difference market parameter value is correlated with an increase in the price movement of a security.

It will be further understood that optimized market parameter(s) and/or value(s) often depend on the particular optimization process by which they were determined, including, for example, the number of iterations performed, the optimization period used, and/or the point at which the optimization process ends. In some instances, two similar (or even identical) optimization processes performed over the same optimization period may not produce the same optimized market parameter(s) and/or value(s). Indeed, embodiments of the present invention provide a number of different ways to determine optimized market parameter(s) and/or value(s) for any given security over any given optimization period, and these are discussed in more detail with regards to FIGS. 2A, 2B, 4A, and 4B herein.

It will be understood, in view of this disclosure, that determining one or more market parameters and values (and/or optimized market parameters and values) is typically tantamount to determining at least one investment strategy for the security. For example, one embodiment of the present invention may review historical data for ETF X over all of the trading days since 2004 and determine that the price of ETF X typically increases after a trading day where the uniform close is greater than 90 and the uniform difference is greater than 15. In such a case, one embodiment may determine that one strategy for investing in ETF X is to buy ETF X only when these market parameter values are met, i.e. only where the day's uniform close is greater than 90 and the day's uniform difference is greater than 15. On the other hand, another embodiment may determine that another strategy for investing in ETF X may be to sell ETF X short after every trading day where the market parameter values are not met, i.e. where the day's uniform close is less than or equal to 90 and/or the day's uniform difference is less than or equal to 15. Thus, it will be understood that one or more investment strategies for a security may be based on one or more market parameters and values for the security. For simplicity, however, much of the following description refers to the investment strategy of buying a security when the security's market parameter value(s) are met, and not buying the security when the security's market parameter value(s) are not met.

It will also be understood that, in addition to one or more market parameters and values, an investment strategy may involve any one or more logic operators, such as AND, OR, NOT, IF, THEN, IF AND ONLY IF, BUT, NEITHER, NOR, BOTH, HOWEVER, and the like, and/or any combination or derivation of the foregoing. For example, one investment strategy for investing in Stock Z may be to buy Stock Z after a trading day where the uniform close market parameter value is greater than 85 OR the uniform open market parameter value is less than 15. As another example, another investment strategy for investing in Stock Z may be to buy Stock Z after the trading day where the uniform close market parameter value is greater than 62 AND the uniform difference is greater than 10, OR the daily close market parameter value is greater than $25/share.

It will further be understood that, in some cases, market parameter value(s) (and/or optimized market parameter value(s)) may only correspond to a satisfactory investment strategy over the optimization period and not over other historical time periods. Accordingly, in some embodiments of the present invention, the optimized market parameter value(s) are backtested over a backtesting period, which is a set of past trading days generally different from the optimization period, to determine if the optimized market parameter value(s) produce satisfactory investment outcomes over a time period different from the time period used to identify the optimized market parameter value(s). For example, one embodiment of the present invention may determine that the optimized market parameter values for mutual fund K is a daily close less than $32.00 per share, a gap up greater than $2.00, and a uniform close greater than 75, based on a certain optimization period. However, an investment strategy that buys shares of mutual fund K according to these optimized market parameter values may not produce satisfactory investment outcomes over a different historical time period, i.e. a backtesting period. In such a case, some embodiments of the present invention are configured to test other market parameter value(s) by performing multiple iterations of the same optimization process and/or using another optimization process altogether.

Referring now to FIG. 1, a flow diagram illustrating a general process flow 100 of an investment strategy system is provided, in accordance with one embodiment of the present invention. As represented by block 110, the investment strategy system receives one or more user inputs about a security, an optimization period, and a backtesting period. In one embodiment, these user inputs include the name, or other identification information, of the security (which, as described above, may be a group of stocks, bonds, etc., such as an index), the dates for the optimization period, and the dates for the backtesting period (the date input may be, in some embodiments, input such as a start date and an end date, a month or other period, a number of days dating forward or back from a certain date, such as the current date, and/or the like). In another embodiment, the user input may include a loss tolerance value. For example, a user may direct an investment strategy system having the flow 100 to reject any investment strategy that results in a loss of more than half of an initial investment amount at any one point during the optimization and/or backtesting period. In another embodiment, the user input may include an end condition that defines when the investment strategy system should cease searching for a better investment strategy. Exemplary end conditions are described herein below with respect to one or more embodiments of the general process flow 100. In still another embodiment, the user input may include one or more market parameters or market parameter values for the investment strategy system to consider in determining an investment strategy. Of course, it will be understood that other embodiments of the invention may be configured to receive more, less, and/or different kinds of user inputs.

After receiving one or more user inputs, the investment strategy system determines an investment strategy for the security by determining one or more optimized market parameters and one or more market parameter values for the security over the optimization period, as represented by block 120. This event may be performed in a number of different ways, all of which is discussed in more detail herein with respect to FIGS. 2A and 2B.

After determining one or more optimized market parameters and values, the investment strategy system then backtests the investment strategy over the backtesting period, as represented by block 130. As explained above, the backtesting period is typically a period of time different from the optimization period so that the seemingly optimized market parameters and values are tested over a historical data range that is different from the data range from which the optimized market parameters and values was originally determined. However, in some embodiments, the two periods may have some overlap, or, in one embodiment, the optimization period and the backtesting period may be the same.

As represented by block 140, the investment strategy system then determines whether the investment strategy yielded a satisfactory investment outcome over the backtesting period. An example of a satisfactory investment outcome may be one that yields an investment outcome over the backtesting period that is greater than or equal to the investment outcome yielded over the optimization period. Another example of a satisfactory investment outcome may be one that yields an investment outcome over the backtesting period that is greater than or within a certain user-defined or other predefined percentage or value from the investment outcome yielded over the optimization period. It will be understood that other embodiments may have different definitions for a satisfactory investment outcome, and that these definitions may be determined by a user, the investment strategy system, and/or some other thing.

If an investment strategy system having the flow 100 illustrated in FIG. 1 determines that the investment strategy yields a satisfactory investment outcome over the backtesting period, the investment strategy system, as represented by block 150, implements the investment strategy to invest in the security in the future. In one embodiment, for example, the investment strategy system is configured to output a trade recommendation and/or trading decision (e.g., "buy," "hold," "sell," etc.) for investing in the security on the next and/or a future trading day. For example, in one embodiment, the one or more trade recommendations and/or trading decisions are displayed to a user via the display device of a computerized apparatus. In another embodiment, for example, the investment strategy system is configured to interact with a security trading system to automatically trade the security itself based at least partially on the one or more trade recommendations and/or trading decisions determined by the investment strategy system.

If an investment strategy system having the flow 100 determines that the investment strategy does not yield a satisfactory investment outcome, the investment strategy system is configured, in one embodiment, to repeat the events represented by blocks 120, 130, and 140 (each time using, for example, different combinations of starting market parameters and/or values, different algorithms for finding the "best" investment strategy, different optimization periods, and/or a different backtesting periods) until a satisfactory investment strategy is determined, as illustrated in FIG. 1. In another embodiment, however, the system may be configured to repeat the events represented by blocks 120, 130, and 140 until a different and/or additional end condition is reached. For example, in one embodiment, the system may perform one or more iterations of the flow 100 until a predetermined number of iterations has been exceeded. Other exemplary end conditions may include exceeding a loss tolerance over the optimization and/or backtesting period, using market parameter values that fall outside of a certain range, exceeding a certain investment return relative to some benchmark, and/or the like.

Given some system limitations and user inputs, it will be understood that many embodiments of an investment strategy system having the flow 100 are not capable of testing every possible combination of market parameter and market parameter value in order to determine the absolute best investment strategy for a security. In this regard, it will be understood that the "best" investment strategy, as referred to herein, may not be the best investment strategy in absolute terms; rather, in many embodiments herein, the best investment strategy represents only the best investment strategy for the security over an optimization period and/or backtesting period, as determined by an investment strategy system having the flow 100. In this regard, the investment strategy identified as the "best" investment strategy is sometimes referred to herein as a "satisfactory" investment strategy. Similarly, the one or more optimized market parameters and/or optimized market parameter values may not be the absolute best market parameter(s) and/or value(s) upon which to base an investment strategy for the security. Rather, in many embodiments herein, the optimized market parameter(s) and/or value(s) represent only the best market parameter(s) and/or value(s) as determined by an investment strategy system having the flow 100 over an optimization and/or backtesting period.

Of course, it will also be understood that the number and/or order of the events described in FIG. 1 is exemplary and may vary. For example, in one embodiment, an investment strategy system is not configured to backtest the investment strategy determined for the security. As another example, in another embodiment, an investment strategy system may be configured to receive one or more user inputs about a backtesting period only after an investment strategy for the security has been determined.

Referring now to FIG. 2A, a general process flow 200 for determining a satisfactory investment strategy for a security is provided, in accordance with one embodiment of the present invention. As represented by block 210, an investment strategy system having the process flow 200 is configured to determine a first set of investment strategies. As described with reference to the flow 200, it will be understood that the first set of investment strategies includes at least two investment strategies. It will further be understood that each investment strategy is related to one or more market parameters for a security and one or more values for those market parameters. For example, in Table 2 below, an exemplary first set of investment strategies for investing in Stock X is illustrated:

TABLE 2

Exemplary First Set of Strategies for Investing in Stock X

|  | Uniform Close (≥) | Uniform Difference (≥) |
|---|---|---|
| Strategy 1 | 30 | −10 |
| Strategy 2 | 60 | 0 |
| Strategy 3 | 90 | 10 |

As shown, Strategy 1 represents an investment strategy that buys Stock X after a trading day where the uniform close is greater than or equal to 30 and the uniform difference is greater than or equal to −10. The same investment strategy sells Stock X (or holds cash) after a trading day where these market parameter conditions are not met. As illustrated in the example, Strategy 2 represents an investment strategy that buys Stock X after a trading day where the uniform close is greater than or equal to 60 and the uniform difference is greater than or equal to 0, and sells when these conditions are not met. Strategy 3 represents an investment strategy that buys Stock X after a trading day where the uniform close is greater than or equal to 90 and the uniform difference is greater than or equal to 10, and sells when these conditions are not met. It will be understood that the number, type, and/or value for the market parameters illustrated in Table 2, and the corresponding investment strategies, are for illustrative purposes only. In other embodiments, any other number, type, and/or value for the market parameter(s), and/or a different sell, hold, and buy strategy, may be used instead.

It will also be understood that these investment strategies may be determined by any known method. For example, in one embodiment, one or more of the investment strategies are randomly determined by an investment strategy system having the process flow 200. In another embodiment, one or more of the investment strategies are determined by a system having the process flow 200 based at least partially on historical data for Stock X. In yet another embodiment, one or more of the investment strategies are based at least partially on one or more user inputs.

As represented by block 220 in FIG. 2A, once each investment strategy is determined, an investment strategy system having the process flow 200 then determines the investment outcome for each investment strategy over an optimization period. With reference to the example above, Table 3 below illustrates an exemplary investment outcome for each investment strategy in Table 2 on an initial $10,000 investment in Stock X:

TABLE 3

Exemplary Investment Outcomes for First Set of Investment Strategies

|  | Uniform Close (≥) | Uniform Difference (≥) | Investment Outcome |
|---|---|---|---|
| Strategy 1 | 30 | −10 | $8,000 |
| Strategy 2 | 60 | 0 | $10,000 |
| Strategy 3 | 90 | 10 | $12,000 |

As illustrated, the investment outcome for Strategy 1 was $8,000 over the optimization period. In other words, when Strategy 1 was simulated using historical market data for Stock X during the optimization period, Strategy 1 lost $2,000 on its original $10,000 investment by following a strategy of buying Stock X on the trading day(s) after the uniform close was greater than or equal to 30 and the uniform difference was greater than or equal to −10, and selling Stock X (or holding cash) on every other trading day. Although this may be different in other embodiments, it will be understood that, for simplicity, the investment strategy system bought and sold entire positions of Stock X according to each investment strategy. In other words, once a buy was triggered according to Strategy 1, the investment strategy system bought as much of Stock X as possible, instead of using only a portion of its investment funds to buy Stock X. As also illustrated in Table 2, in this example, Strategy 2 resulted in no gain and Strategy 3 resulted in a $2,000 gain over the optimization period.

Although represented in terms of dollars in the example above, it will be understood that investment outcomes may be represented in any way, including words, numbers, colors, currencies, percentages, etc, when presented to a user using a user output device. It will also be understood that other embodiments of the present invention may represent investment outcomes in terms of some characteristic other than, or in addition to, gains and losses. For example, one embodiment of the present invention is configured to invest in ten (10) year U.S. Treasury bonds, and the corresponding investment outcomes are represented in terms of percentage yields. In another example, the gains and losses are determined relative to some market benchmark such as inflation or the performance of a well-known market index. As such, some embodiments of the present invention will present gains and losses to a user by showing the percentage or value gained or lost from the benchmark.

As represented by the block 230, after determining the investment outcome for each investment strategy, an investment strategy system having the process flow 200 then determines whether an end condition has been reached. If an end condition has not been reached, then the investment strategy system performs the event represented by the block 240, which is described in more detail herein. If an end condition has been reached, then the investment strategy system outputs information about the investment strategy having the best investment outcome, as represented by the block 250. In one embodiment, this output information includes the optimized market parameter(s) and value(s) for the investment strategy, so that, for example, the investment strategy may be backtested over a backtesting period. In some embodiments, the output information includes information about the investment outcome over some period of time relative to, for example, the performance of some other market index or barometer, such as a popular index or inflation. It will be understood that a system having the process flow 200 may output any information about the best investment strategy to any user, organization, system, network, machine, and/or some other thing.

It will be understood that an investment strategy system having the process flow 200 may have any number or type of end condition(s). For example, in one embodiment, an end condition is reached once the system determines an investment strategy that yields a satisfactory investment outcome over the optimization period, where what is satisfactory is determined by the user or by the system. In another embodiment, an end condition is met once an investment strategy system exceeds a particular length of time in performing the general process flow 200. Other exemplary end conditions include exceeding a particular number of iterations, exceeding a loss tolerance, failing to find any combinations of market parameter(s) and/or market parameter value(s) that yield better investment outcomes, using market parameter value(s)

that fall outside of a certain range, falling into a repetitive loop where the same few investment strategies result from each new iteration, etc.

If an end condition is not reached, then an investment strategy system having the process flow 200 determines a second (or another) set of one or more investment strategies based on a comparison of the investment strategy in the first set having the best investment outcome to one or more of the other investment strategies in the first set, as represented by block 240. In one embodiment, the system is configured to determine the second set of investment strategies by using a type of greedy algorithm. A greedy algorithm is typically defined as any problem-solving approach that follows the locally optimal choice at each decision stage. For example, the greedy algorithm approach to solving the well-known Traveling Salesman Problem is to always visit the unvisited city nearest to the current city. As an example related to the present invention, one embodiment of an investment strategy system having the process flow 200 may determine that an investment strategy A in a first set of investment strategies has the best investment outcome and also the lowest daily close market parameter value relative to the other strategies tested in the first set. In such a case, the system may be configured to determine a second set of investment strategies based at least partially on this information, e.g., each investment strategy in the second set may have a lower daily close market parameter value than the value used in investment strategy A. In other words, in one embodiment, an investment strategy system having the process flow 200 is configured to follow a trend that yields better investment outcomes until that trend no longer applies.

In some embodiments, an investment strategy system having the process flow 200 is configured to determine a second set of one or more investment strategies based at least partially on a mathematical comparison between two or more investment strategies in the first set. For example, in one embodiment, the system is configured to graphically represent each investment strategy in the first set in n-dimensional space, where n equals the number of market parameters involved in each strategy plus one to account for the investment outcome. In other words, each investment strategy and its corresponding investment outcome are represented as a set of coordinates. For example, an investment strategy Z having a daily close market parameter value of 30 and a gap down market parameter value of −2 may yield an investment outcome of $12,000 over an optimization period. As a set of coordinates, the investment strategy Z may be represented, according to one embodiment, as (30, −2, $12,000). After representing each of the investment strategies in this way, the system then determines a slope or vector between the investment strategy with the best investment outcome and each of the other investment strategies in the first set. Then, the system uses the slope(s) or vector(s) to determine a direction in which to adjust the market parameter value(s) of the investment strategies in the first set in order to determine a second set that appears more likely to yield better investment outcomes than if the second set were randomly generated.

To give a more specific example of this approach, FIG. 2B provides a three-dimensional coordinate system 260 that graphically illustrates an exemplary first set of investment strategies 261, 262, 263, and 264 that are based on two market parameters, namely, gap up and daily close, to produce an investment outcome. Accordingly, each investment strategy is positioned in the coordinate system 260 with respect to a gap up axis 260x, a daily close axis 260y, and an investment outcome axis 260z based on each investment strategy's gap up market parameter value, daily close market parameter value, and corresponding investment outcome. It will be understood that, for simplicity, the gap up, daily close, and investment outcome values each increase in the direction of the respective axes 260x, 260y, and 260z to which they correspond. Accordingly, as shown in FIG. 2B, the investment strategy 264 had the highest relative gap up and daily close market parameter values and, in this example, also yielded the highest investment outcome. The investment strategy 262 had the lowest relative gap up and daily close market parameter values and yielded the lowest investment outcome.

Also shown in FIG. 2B are the vectors 261a, 262a, and 263a that connect the investment strategies 261, 262, and 263 to the investment strategy 264, respectively. Each of these vectors represents a graphical indication of the direction in which to adjust the market parameter value(s) of the investment strategies in the first set in order to determine a second set of investment strategies that may yield higher investment outcomes. Following this approach, the vectors shown in FIG. 2B indicate that the second set of investment strategies should be positioned in the three-dimensional space 265, since any investment strategy positioned in that space appears likely to have a higher investment outcome than any of the strategies in the first set. As shown in FIG. 2B, the space 265 is bounded by the vectors 261b, 262b, and 263b, which are extensions of the vectors 261a, 262a, and 263a, respectively.

Of course, it will be understood that the approach described above with reference to FIG. 2B may not always produce investment strategies that yield higher or better investment outcomes. For example, an investment strategy having the proper combination of daily close and gap up market parameter values for otherwise positioning that strategy in the space 265 may actually yield a lower investment outcome outside of that space if the relationship(s) are not actually linear. It will also be understood that the number and type of investment strategies and/or the number, type, and/or contour of the vectors and curves illustrated in FIG. 2B are exemplary and that other embodiments of the present invention may be different. For example, in one embodiment, an investment strategy system performing one or more of the events in the process flow 200 is configured to determine a second set of investment strategies by using the general problem solving approach illustrated in FIG. 2B and described herein, except that different types of market parameters are involved. For example, in one embodiment, the investment strategies simultaneously consider more than two market parameters and, as such, many other dimensions are considered in the optimization process.

In other embodiments, other procedures and algorithms may be used to determine a second (or another) set of one or more investment strategies better than the first set of investment strategies. For example, in one embodiment, an investment strategy system having the process flow 200 is configured to determine a second set of one or more investment strategies by adjusting only one or more market parameter values for the investment strategy having the best investment outcome. In one embodiment, the market parameter value(s) for that investment strategy are adjusted in every direction to see if a better investment outcome is possible. For example, a system having the process flow 200 may determine the exemplary second set of investment strategies below in Table 4 based on an adjustment to investment strategy 3 illustrated in Tables 2 and 3:

TABLE 4

Exemplary Second Set of Investment Strategies

|  | Uniform Close (≧) | Uniform Difference (≧) |
|---|---|---|
| Strategy 4 | 91 | 10 |
| Strategy 5 | 89 | 10 |
| Strategy 6 | 90 | 9 |
| Strategy 7 | 90 | 11 |

As illustrated in Table 4, this second set of investment strategies is configured to determine whether a better investment strategy than investment strategy 3 in Table 3 is possible. More specifically, each investment strategy in the second set holds one market parameter value from investment strategy 3 constant while adjusting the other market parameter value either up or down. The investment outcomes for this second set then help the investment strategy system determine subsequent adjustments. For example, assume investment strategies 4-6 each yield an investment outcome of $11,000 (less than that yielded by investment strategy 3), while investment strategy 7 yields an investment outcome of $13,000 (greater than that yielded by investment strategy 3). In such a case, an investment strategy system having the flow 200 may determine a subsequent investment strategy having a uniform difference market parameter value greater than 11 (e.g., 12) and a uniform close market parameter value of 90, in order to see if a better investment outcome is possible.

Regardless of the approach used, once an investment strategy system having the process flow 200 determines a second set of investment strategies, the system then iterates each of the events represented by the blocks 220, 230, and/or 240 again until an end condition is reached. For example, using the example represented in Tables 2-4 above, the investment strategy system may continue to guess and adjust investment strategies for investing in Stock X until an investment strategy yields an investment outcome of $20,000 or greater over the optimization period. Once an end condition is reached, such as an investment outcome of $20,000 or greater in the above example, an investment strategy system having the flow 200 outputs the investment strategy with the best investment outcome, as represented by the block 250.

In one embodiment, described in greater detail in relation to FIGS. 4A and 4B, the process flow includes another loop to determine a "best" investment strategy. For example, in one embodiment, a first type of investment strategy is considered by selecting a first combination of market parameters from a group of available market parameters to use in the investment strategy. The system then uses the process flow 200 to determine an optimized investment strategy (e.g., optimized market parameter(s) and value(s)) by testing a plurality of different values for the first combination of market parameters over an optimization period. The system then considers a second type of investment strategy by selecting a second combination of market parameters from a group of available market parameters. As before, the system uses the process flow 200 to determine an optimized investment strategy (e.g. optimized market parameter(s) and value(s)) by testing a plurality of different values for the second combination of market parameters over the same optimization period. In one embodiment, the system continues this process until all combinations of the group of available market parameters are considered. The system may then compare the investment outcome for each optimized investment strategy from each combination of market parameters in order to identify the best investment strategy having the best combination of market parameter(s) and market parameter value(s) to produce the best investment outcome.

It will be understood that, in some embodiments, an investment strategy system may have a general process flow that integrates one or more events from the general process flows 100 and 200. More specifically, in one embodiment, one or more of the events represented by the general process flow 200 may be collectively represented by the block 120 in the general process flow 100 of FIG. 1.

Referring now to FIG. 3, an investment strategy system 300 is provided, in accordance with one embodiment of the present invention. The investment strategy system 300 includes a network 310, a user interface system 320, and an optimization system 330. In some embodiments, the investment strategy system 300 also includes a market data system 350 and a security trading system 360. Each of the portions of the investment strategy system 300 is operatively connected to the network 310, which may include one or more separate networks. Additionally, the network 310 may include a direct connection, a local area network (LAN), a wide area network (WAN), and/or a Global Area network (GAN), such as the Internet. It should be understood that the network 310 may be secure and/or unsecure and may also include wireless and/or wireline technology.

In one embodiment, the user interface system 320 is configured to allow a user to communicate with other networks and/or portions of the investment strategy system 300 and/or vice versa. For example, the user may use the user interface system 320 to communicate the name of a security, an optimization period, a backtesting period, and/or a loss tolerance to the optimization system 330. As another example, a user may use the user interface system 320 to send and/or receive one or more investment strategies to and/or from the optimization system 330. In still another example, the user may use the user interface system 320 to communicate with the security trading system 360 to trade securities or to communicate with the optimization system 330 to request that the optimization system 330 communicate with the security trading system 360 to trade securities automatically in accordance with a selected/optimized investment strategy. It will be understood that the user interface system 320 may be configured to facilitate real-time or substantially real-time communication between the user and other portions of the investment strategy system 300.

It will also be understood that the user interface system 320 may include, for example, a personal computer system, a portion of a computer network, an Internet web browser operated by a processing device, a telephone, a mobile phone, a personal digital assistant, a public kiosk, a fax machine, and/or some other type of communication device. In one embodiment, as illustrated, the user interface system 320 includes a communication interface 322, a processor 324, a memory 326 having a browser application 327 and/or other network communication application, and a user interface 329. The communication interface 322 is operatively connected to the processor 324, which is operatively connected to the user interface 329 and the memory 326 having the browser application 327.

Each communication interface described herein, including the communication interface 322, includes hardware, and, in some instances, software, that enables a portion of the investment strategy system 300, such as the user interface system 320, to transport, send, receive, and/or otherwise communicate information to and/or from one or more other portions of the investment strategy system 300. For example, the communication interface 322 of the user interface system 320 may include a modem, server, and/or other electronic device that operatively couples the user interface system 320 to another electronic device, such as the communication interface 332 of the optimization system 330.

Each processor described herein, including the processor 324, includes circuitry required for implementing the audio, visual, and/or logic functions of that portion of the investment strategy system 300 to which the processor belongs. For example, the processor 324 of the user interface system 320 may include a digital signal processor device, a microprocessor device, and/or various analog-to-digital converters, digital-to-analog converters, and/or other support circuits. Control and signal processing functions of the user interface system 320 may be allocated between these devices according to their respective capabilities. The processor 324 may include functionality to operate one or more software programs based on computer-executable program code thereof, which may be stored, for example, in the memory 326 of the user interface system 320.

Each memory device described herein, including the memory 326 for storing the browser application 327 and other data, may include any computer-readable medium. For example, the memory 326 of the user interface system 320 may include volatile memory, such as volatile random access memory (RAM) including a cache area for the temporary storage of data. The memory 326 may also include other non-volatile memory, which may be embedded and/or may be removable. The non-volatile memory can additionally or alternatively include an EEPROM, flash memory, or the like. The memory 326 can store any one or more pieces of information and/or data used by the user interface system 320 to implement the functions of the user interface system 320.

The browser application 327 may comprise any computer-readable instructions configured to allow the user interface system 320 to communicate with other devices over a network using, for example, one or more network and/or system communication protocols. For example, in one embodiment, the browser application 327 includes an Internet web browser used by the user interface system 320 for communicating with various portions of the investment strategy system 300.

The user interface 329 generally includes one or more user output devices, such as a display and/or speaker, for presenting information to a user. The user interface 329 further includes one or more user input devices, such as one or more keys or dials, a touch pad, touch screen, mouse, microphone, camera, and/or the like, for receiving information from the user.

Also illustrated in FIG. 3 is an optimization system 330, in accordance with one embodiment of the present invention. The optimization system 330 may include, for example, a portion of a computer network, an engine, a platform, a server, a datastore system, a front end system, a back end system, a personal computer system, and/or some other type of computing device. In one embodiment, as illustrated, the optimization system 330 includes a communication interface 332, a processor 334, and a memory 336 having an optimization application 337 and an optimization datastore 338. The communication interface 332 is operatively connected to the processor 334, which is operatively connected to the memory 336 having the optimization application 337 and the optimization datastore 338.

In one embodiment, the optimization application 337 includes computer-executable program code for instructing the processor 334 to receive user inputs and/or historical data about a security from, for example, the market data system 350 and/or the optimization datastore 338. The optimization application 337 further includes computer-executable program code for instructing the processor 334 to determine one or more investment strategies using any of the methods described herein, such as the methods illustrated in FIGS. 1, 2A, 2B, 4A, and 4B. In this regard, in one embodiment, the optimization application 337 includes computer-executable program code for instructing the processor 334 to determine one or more optimized market parameters and market parameter values for a security over an optimization period. In one embodiment, the optimization application 337 comprises computer-executable program code for instructing the processor 334 to backtest one or more investment strategies over a backtesting period. Indeed, it will be understood that the optimization application 337 may include computer-executable program code for instructing the processor 334 to perform any one or more of the events described herein that relate to determining an investment strategy for a security.

As illustrated in FIG. 3, the memory 336 also comprises an optimization datastore 338. In some embodiments, the optimization datastore 338 comprises one or more predefined rules for performing any one or more of the events described herein that relate to determining an investment strategy for a security. For example, the optimization datastore 338 may comprise information relating to an end condition, an optimization period, and/or a backtesting period. As another example, the optimization datastore 338 may comprise information relating to one or more assumptions about how the price of any given security moves. In some embodiments, the optimization datastore 338 is configured to store data. For example, in one embodiment, the optimization datastore 338 comprises historical data about a security. The optimization datastore 338 may also be configured to save one or more investment outcomes and the corresponding investment strategies (and/or market parameter(s) and value(s)) that result from using the optimization system 330. It will be understood that, in at least one embodiment, the optimization datastore 338 provides a substantially real-time representation of the data and/or one or more rules contained therein, so that when the processor 334 accesses the optimization datastore 338, the information stored therein is current or substantially current.

In this regard, in one embodiment, the optimization system 330 is configured to constantly, periodically, on occasion, or on request communicate with a market data system 350 to obtain data about one or more market parameters and/or market parameter values for one or more securities. As illustrated, such a market data system 350 may be communicatively connected to the network 310 using a communication interface 352. The market data system 350 generally includes a processor 354 operatively connected to the communication interface 352 that is configured to gather and store market parameter data 358 regarding one or more market parameters and values in a memory 356 in real time or near real time.

It will be understood that, in at least one embodiment, the investment strategy system 300 is configured to implement the general process flow 100 described herein. For example, in one embodiment, the optimization system 330 receives one or more user inputs about a security, an optimization period, and a backtesting period from a user using the user interface system 320, as represented by the block 110. Then, as represented by the block 120, the optimization system 330 is configured to determine an investment strategy for the security by determining one or more optimized market parameters and values for the security over the optimization period. Afterwards, as represented by the blocks 130 and 140, the optimization system 330 is configured to backtest the investment strategy over the backtesting period and then determine whether that strategy yielded a satisfactory investment outcome over the backtesting period. If yes, then the optimization system 330 is configured to use the investment strategy to invest in the security in the future, as represented by the block 150. If no, then the optimization system 330 is configured to repeat one or more of the events represented by the blocks 120, 130, and/or 140, as illustrated in FIG. 1.

Additionally, it will also be understood that, in at least one embodiment, the investment strategy system 300 is configured to implement one or more of the events of the general process flow 200 described herein. For example, in one embodiment, the optimization system 330 and/or a user determines a first set of investment strategies, as represented by the block 210 in FIG. 2A. Then, as represented by the block 220, the optimization system 330 determines an investment outcome for each of the investment strategies in the first set. As represented by the block 230, the optimization system 330 and/or the user then determines whether an end condition has been reached. If yes, then the optimization system 330 outputs information about the investment strategy having the best investment outcome, as represented by the block 250. If no, then the optimization system 330 is configured to perform and/or repeat one or more of the events represented by blocks 220, 230, and 240, as illustrated in FIG. 2A.

It will further be understood that some or all of the portions of investment strategy system 300 may be combined into a single portion, i.e. the user interface system 320 and the optimization system 330 may be combined into a single user interface and optimization system configured to perform all of the functions of those separate portions as described herein. Likewise, some or all of the portions of investment strategy system 300 may be separated into two or more distinct portions, i.e. optimization system 330 may be separated into a market parameter optimization system and a backtesting system.

In addition, the various systems of the investment strategy system 300 may be controlled, operated, managed, stored, and/or maintained, etc. (herein "maintained" for simplicity) by the same or separate parties. For example, in one embodiment, a consumer may maintain the user interface system 320, a bank may maintain the optimization system 330, and third parties may maintain the market data system 350 and the security trading system 360. As another example, a financial institution may maintain each and every portion of the investment strategy system 300, including any embodiments of the network 310, the user interface system 320, the optimization system 330, the market data system 350, and the security trading system 360 as described herein.

Referring now to FIGS. 4A and 4B, a general process flow 400 of an investment strategy system, such as an embodiment of the investment strategy system 300, is provided, in accordance with one embodiment of the invention. It will be understood that the general process flow 400 may represent a more specific embodiment of one or more of the processes already described herein. It will also be understood that, although reference is made herein to an investment strategy system performing many of the events of the general process flow 400, a user may at least partially perform and/or help perform one or more of the events of the general process flow 400 instead.

As represented by the block 405, a user of an investment strategy system having the flow 400 determines a security to consider investing in. As described previously, the security may be any stock, index, bond, mutual fund, or the like. In one embodiment, the investment strategy system may aid the user in making this determination or the user may determine a security to consider investing in without any aid from the investment security system. It will be understood that, in another embodiment, the investment strategy system having the flow 400 may determine the security to invest in instead of, or with help from, the user.

As represented by the block 410, the user of the investment strategy system then determines a plurality of market parameters to consider using in an investment strategy. In one embodiment, the investment strategy system may aid the user in making this determination or the user may determine the plurality of market parameters to consider using in an investment strategy without any aid from the investment security system. It will be understood that, in another embodiment, the investment strategy system having the flow 400 may determine the plurality of market parameters to consider using in an investment strategy instead of, or with help from, the user.

As represented by the block 415, the investment strategy system having the flow 400 then gathers historical market data for each of the plurality of market parameters for the security. As described previously, this information may be gathered from one or more portions of the investment strategy system having the flow 400, such as, for example, in one embodiment, the market data system 350, or the information may be gathered at least in part from another system, such as an Internet website. In one embodiment, the user provides the historical market data to the investment strategy system having the flow 400. It will be understood that the historical market data for each of the plurality of market parameters may correspond to any historical period of time, such as, for example, historical market data for each of the plurality of market parameters on every day the market was open in 2004. In one embodiment, the historical market data comprises information over a user- or investment strategy system-selected historical period of time.

As represented by the block 420, the investment strategy system then selects a first combination of market parameters from the plurality of market parameters for the security. This selection may relate at least in part to an underlying assumption about how the price of the security moves. For example, in one embodiment, it may be assumed that if Stock J closes at a price near its daily high, then it is likely that the price of Stock J will continue to rise on the following trading day. Accordingly, a strategy for investing in Stock J may be based at least partially on one or more market parameters of Stock J that relate to this assumption, such as, for example, the daily close, uniform close, uniform different, gap up, and/or gap down. In another embodiment, the first combination of market parameters may be determined at random by a user and/or an investment strategy system having the flow 400. It will be understood that the first combination of market parameters may include any one or more of the market parameters determined in the event represented by the block 410.

After selecting a first combination of market parameters, the investment strategy system having the flow 400 then determines a plurality of different investment strategies by selecting a plurality of different market parameter value combinations for the current combination of market parameters, as represented by the block 425. For example, one embodiment of the investment strategy system having the flow 400 may select the investment strategies for Stock X as described in Table 2 herein. It will be understood that although the market parameter value combinations are different, one or more of the individual market parameter values for one or more investment strategies may overlap, be similar, or be the same. For example, using the example described in Table 2 herein, one embodiment of the investment strategy system having the flow 400 may determine that Strategy 2 for investing in Stock X, instead of having a uniform close market parameter value greater than or equal to 60, has a uniform close market parameter value greater than or equal to 30, just like Strategy 1.

It will be understood that one or more investment strategies may discount and/or ignore one or more selected market parameters and/or one or more market parameter values. For example, according to one embodiment, one investment strategy may be based on a uniform difference market parameter value and a daily open market parameter value, where that the uniform difference market parameter value is any value from 1 to 100. In such an example, the investment strategy effectively ignores the uniform difference market parameter since every possible market parameter value (1 to 100) matters equally to the investment strategy.

As represented by the block 430, after the investment strategy system determines a plurality of different investment strategies, the system then determines an investment outcome for each investment strategy over an optimization period. In another embodiment, the investment strategy system having the flow 400 may be additionally or alternatively configured to determine whether a loss tolerance was exceeded or the like when testing the investment strategy over the optimization period.

As represented by the block 435, the user and/or the investment strategy system must then decide whether an end condition has been reached after testing each of the investment strategies over the optimization period. If an end condition has not been reached, then the investment strategy system compares the investment outcomes of each investment strategy and uses the outcomes to determine different investment strategies likely to produce better investment outcomes, as represented by the block 440. In one embodiment, the system may additionally or alternatively compare the market parameter value(s) of each investment strategy and use those value(s) to determine different investment strategies likely to produce better investment outcomes. It will be understood that this comparison and determination event may include any of the one or more processes described herein, including, for example, any of the processes described herein in connection with FIG. 2B. As shown in FIG. 4A, after comparing and determining, the system having the flow 400 is configured to perform and/or iterate the events represented by the blocks 430, 435, and 440 until an end condition has been reached.

Once an end condition has been reached, the investment strategy system having the flow 400 is configured to store the best investment outcome obtained for the current combination of market parameters, as represented by the block 445 in FIG. 4B. In one embodiment, the system is additionally or alternatively configured to store the investment strategy (and/or the market parameter(s) and/or market parameter value(s)) that correspond to the best investment outcome obtained for the current combination of market parameters.

After storing the best investment outcome, the investment strategy system then determines whether all combinations of market parameters have been considered, as represented by the block 450. It will be understood that, in some embodiments, "all combinations" may actually be less than all of the possible mathematical combinations of the plurality of market parameters determined in connection with the event represented by the block 410. For example, computer speed and/or one or more user inputs may limit the number of considered combinations of market parameters to only four combinations where there are actually twenty-four possible mathematical combinations of the plurality of market parameters.

If not all combinations of market parameters have been considered, then the investment strategy system having the flow 400 is configured to select another combination of market parameters from the plurality of market parameters, as represented by the block 455. For example, one embodiment of an investment strategy system may select a first combination of market parameters that includes the daily close, the uniform close, and the gap up market parameters for the security. After storing the best investment outcome from that combination of market parameters, the investment strategy system may select another combination of market parameters to consider that includes the daily close, the uniform difference, and the gap down market parameters for the security. It will be understood that one or more market parameters in the first combination of market parameters may also be included in other combinations of market parameters. Once a second (or another) combination of market parameters is selected, the investment strategy system having the flow 400 is configured to iterate the events represented by the blocks 425 through 455 until all combinations of market parameters have been considered.

Once all combinations of market parameters have been considered, the investment strategy system then compares the best investment outcomes in each combination of market parameters considered to determine the best (or "most optimized") investment strategy having the best (or "most optimized") market parameter(s) and best (or "most optimized") market parameter value(s), as represented by the block 460. As described previously herein, it will be understood that the "best" investment strategy (or "best" market parameter(s) or value(s)) may not be the best investment strategy in absolute terms; rather, in many embodiments herein, the best investment strategy represents only the best investment strategy as determined by the investment strategy system having the flow 400.

In one embodiment, the investment strategy system having the flow 400 may be configured to rank the investment strategies having the best investment outcomes in each combination of market parameters considered. For example, the best investment outcome in a first combination of market parameters considered may be a gain of $15,000, whereas the best investment outcome in a second combination of market parameters considered may be a gain of $16,000. In such a case, the best investment outcome in the first combination may be ranked as the overall second best investment outcome, and the best investment outcome in the second combination may be ranked as the overall first best investment outcome. It will be understood that investment outcomes and/or investment strategies (and/or market parameters and/or values) may be ranked in any known way, such as, for example, by loss tolerance, and according to any known method.

Once the best investment strategy has been determined, the investment strategy system is configured to backtest the best investment strategy over a backtesting period, as represented by the block 465. After backtesting, the investment strategy system having the flow 400 must determine whether the results of the backtesting are satisfactory, as represented by the block 470. If yes, the system outputs and/or implements the investment strategy, as represented by the block 480. In one embodiment, the system merely communicates the investment strategy to the user or a system, such as the security trading system 360, for future use. In another embodiment, the investment strategy system additionally or alternatively implements the investment strategy on the user's behalf to automatically invest in the security.

If the results of the backtesting process are not satisfactory, then the investment strategy system having the flow 400 is configured to consider the second best investment strategy instead of the best investment strategy, as represented by the block 475. In one embodiment, the system is configured to rank all of the investment strategies involved in any one of the events in the flow 400, such that if the overall first best investment strategy does not produce a satisfactory investment outcome over the backtesting period, the system may use the overall second best investment strategy instead. In one embodiment, as shown in FIG. 4B, this second best investment strategy may be backtested as well to determine whether it produces a satisfactory investment outcome over the backtesting period.

Of course, it will be understood that the order and/or number of the events described in FIGS. 4A and 4B is exemplary and may vary. For example, in one embodiment, an investment strategy system having the flow 400 may be configured to backtest each investment strategy for the current combination of market parameters before storing the best investment outcome obtained for that current combination as represented by the block 445. In another embodiment, one or more of the process flow loops shown in FIGS. 4A and/or 4B may involve backtesting as it is described herein. As another example, in another embodiment, an investment strategy system having the flow 400 may not be configured to perform any of the events represented by the blocks 445 through 475, so that once an end condition has been reached, the investment strategy system is configured to output/implement the investment strategy.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
a computer processing device executing computer readable instruction code structured to cause the computer processing device configured to:
  receive information identifying a security;
  receive an optimization period for the security, wherein the optimization period comprises a plurality of historical trading days for the security;
  receive a backtesting period for the security, wherein the backtesting period comprises a plurality of historical trading days for the security that are different than the plurality of historical trading days associated with the optimization period for the security;
  access historical market data for the security, wherein the historical market data includes historical values, over the historical trading days associated with the optimization period and the backtesting period, for one or more market parameters for the security, wherein the one or more market parameters are one or more forms of market data that can be tracked for the security;
  determine an investment strategy for the security, wherein determining the investment strategy comprises:
    determining a correlation value between each of the one or more market parameters for the security and a change in price value of the security based at least partially on evaluating the one or more market parameters for the security over the optimization period, wherein the correlation value indicates a positive or negative change in historical price of the security based on values of the one or more market parameters for the security over the optimization period;
    determining one or more market parameters for the security and values for the one or more market parameters based at least partially on the determined correlation value;
    determining a value of a first investment outcome based at least partially on evaluating the determined one or more market parameters for the security and the values over the optimization period;
    determining a value of a second investment outcome based at least partially on evaluating the determined one or more market parameters for the security and the values over the backtesting period;
    determining an investment outcome that is satisfactory based at least partially on a comparison of the first investment outcome to the second investment outcome, wherein the investment outcome is satisfactory when the second investment outcome is, at least, equal to or greater than the first investment outcome;
  determine a first trading decision and a second trading decision for the security based at least partially on the investment strategy, wherein the first trading decision is different than the second trading decision;
  implement, in real-time or near real-time, the first trading decision for the security via the securities market when the values for the determined one or more market parameters of the security are met;
  implement, in real-time or near real-time, the second trading decision for the security via the securities market when the values for the determined one or more market parameters of the security are not met.

2. The apparatus of claim 1, further comprising:
an input device configured to receive the information identifying the security from a user.

3. The apparatus of claim 1, further comprising:
a memory device having the historical market data for the security stored therein.

4. The apparatus of claim 1, further comprising:
a communication device configured to access, via a network, the historical market data stored on another device.

5. The apparatus of claim 1, wherein the security comprises a stock or a combination of stocks.

6. The apparatus of claim 1, wherein the processor is further configured to use the investment strategy to initiate one or more trades involving the security.

7. The apparatus of claim 1, further comprising:
a communication device, wherein the processor is further configured to use the investment strategy to periodically output, via the communication device, one or more trade recommendations involving the security to a user.

8. The apparatus of claim 1, wherein the historical market data includes historical values for one or more market parameters for the security during the historical period of time.

9. The apparatus of claim 1, wherein the processor is further configured to:
  determine a set of one or more values for the determined one or more market parameters based at least partially on the correlation value between the one or market parameter's value and the security's value during the optimization period historical;

receive an indication of the value of each of the one or more market parameters during a first period of time;

determine whether the value of each of the one or more market parameters during the first period of time falls within the set of one or more values for each of the one or more market parameters; and determine whether to buy or sell the security during a second period of time based at least partially on the determination of whether the value of each of the one or more market parameters during the first period of time falls within the set of one or more values for each of the one or more market parameters.

10. The apparatus of claim 1, wherein the processor is further configured to:

receive a loss tolerance defining a maximum acceptable loss at any given time; and use the loss tolerance to determine an investment strategy that does not, at any time during a defined historical period of time, lose more than the maximum acceptable loss defined by the loss tolerance.

11. The apparatus of claim 10, further comprising:

a communication device, wherein the processor is configured to receive, via the communication device, an indication of the loss tolerance provided by a user.

12. A computer-implemented method for determining an investment strategy for a security, the method comprising the steps of:

receiving an optimization period for the security, wherein the optimization period comprises a plurality of historical trading days for the security;

receiving a backtesting period for the security, wherein the backtesting period comprises a plurality of historical trading days for the security that are different than the plurality of historical trading days associated with the optimization period for the security;

receiving, from a user, a predefined percentage or a predetermined value for determining a satisfactory investment outcome over the backtesting period;

accessing historical market data for the security, wherein the historical market data is stored in memory, and wherein the historical market data includes historical values, over the historical trading days associated with the optimization period and the backtesting period, for one or more market parameters for the security, wherein the one or more market parameters are one or more forms of market data that can be tracked for the security;

determining, by the computer processor, the investment strategy for the security, wherein determining the investment strategy comprises:

determining a correlation value between each of the values of the one or more market parameters for the security and a change in price value of the security based at least partially on evaluating the one or more market parameters for the security over the optimization period, wherein the correlation value indicates a positive or negative change in price of the security based on values of the one or more market parameters for the security over the optimization period;

determining one or more market parameters for the security and values for the one or more market parameters based at least partially on the determined correlation value;

determining a value of a first investment outcome based at least partially on evaluating the determined one or more market parameters for the security and the values over the optimization period;

determining a value of a second investment outcome based at least partially on evaluating the determined one or more market parameters for the security and the values over the backtesting period;

determining an investment outcome that is satisfactory when the value of the second investment outcome evaluated over the backtesting period is the predefined percentage or the predetermined value greater than the value of the first investment outcome;

determining one or more trading decisions for the security based at least partially on the investment strategy.

13. The computer-implemented method of claim 12, further comprising computer executable readable instruction code structured to cause the computer to:

receive information identifying the security from a user.

14. The computer-implemented method of claim 12, wherein the security comprises a stock or a combination of stocks.

15. The computer-implemented method of claim 12, further comprising computer executable readable instruction code structured to cause the computer to:

use the investment strategy to automatically initiate one or more electronic trades involving the security.

16. The computer-implemented method of claim 12, further comprising computer executable readable instruction code structured to cause the computer to:

use the investment strategy to periodically display, using an output device, one or more trade recommendations involving the security to a user.

17. The computer-implemented method of claim 12, further comprising computer executable readable instruction code structured to cause the computer to:

using a processor to determine a set of one or more values for each of the determined one or more market parameters based at least partially on the correlation value between the market parameter's value and the security's value during the optimization period;

receiving an indication of the value of each of the one or more market parameters during a first period of time;

determining whether the value of each of the one or more market parameters during the first period of time falls within the set of one or more values for each of the one or more market parameters; and determining whether to buy or sell the security during a second period of time based at least partially on the determination of whether the value of each of the one or more market parameters during the first period of time falls within the set of one or more values for each of the one or more market parameters.

18. The computer-implemented method of claim 12, further comprising computer executable readable instruction code structured to cause the computer to:

providing a loss tolerance defining a maximum acceptable loss at any given time; and using a processor and the loss tolerance to determine an investment strategy that does not, at any time during a defined historical period of time, lose more than the maximum acceptable loss defined by the loss tolerance.

19. A computer-implemented method for determining an investment strategy for a security, the method comprising the steps of:

receiving an optimization period for the security, wherein the optimization period comprises a plurality of historical trading days for the security;

receiving a backtesting period for the security, wherein the backtesting period comprises a plurality of historical trading days for the security that do not overlap with any of the plurality of historical trading days associated with the optimization period for the security;

accessing historical market data for the security, wherein the historical market data is stored in memory, and wherein the historical market data includes historical values, over the historical trading days associated with the optimization period and the backtesting period, for one or more market parameters for the security, wherein the one or more market parameters are one or more forms of market data that can be tracked for the security;

determining, by a computer processor, the investment strategy for the security, wherein determining the investment strategy comprises:

determining a correlation value between each of the values of the one or more market parameters for the security and a change in price value of the security based at least partially on evaluating the one or more market parameters for the security over the optimization period, wherein the correlation value indicates a positive or negative change in price of the security based on values of the one or more market parameters for the security over the optimization period;

selecting one or more market parameters for the security and values for the one or more market parameters based at least partially on the determined correlation value;

determining a first investment outcome based at least partially on evaluating the selected one or more market parameters for the security and the values over the optimization period;

determining a second investment outcome based at least partially on evaluating the selected one or more market parameters for the security and the values over the backtesting period;

providing a graphical representation of the first investment outcome and the second investment outcome in N-dimensional space, where N equals a number of market parameters involved in each investment outcome plus one for a value of an investment outcome of each investment strategy, and where N is equal to three or greater;

determining an investment outcome that is satisfactory based at least partially on the graphical representation of the first investment outcome and the second investment outcome, wherein the investment outcome is satisfactory when the second investment outcome is, at least, equal to or greater than the first investment outcome;

determining one or more trading decisions for the security based at least partially on the investment strategy.

20. The computer-implemented method of claim 19, wherein the one or more market parameters relate to at least one of the uniform close, uniform difference, daily close, gap up, and gap down for the security.

21. A computer program product for determining an investment strategy for a security, the computer program product comprising a non-transitory computer-readable storage medium having computer-executable program code stored therein, wherein the computer-executable program code comprises:

instructions configured to:

receive an optimization period for the security, wherein the optimization period comprises a plurality of historical trading days for the security;

receive a backtesting period for the security, wherein the backtesting period comprises a plurality of historical trading days for the security that are different than the plurality of historical trading days associated with the optimization period for the security;

access historical market data for the security, wherein the historical market data is stored in memory, and wherein the historical market data includes historical values, over the historical trading days associated with the optimization period and the backtesting period, for one or more market parameters for the security, wherein the one or more market parameters are one or more forms of market data that can be tracked for the security;

determine the investment strategy for the security, wherein determining the investment strategy comprises:

determining a correlation value between each of the values of the one or more market parameters for the security and a change in price value of the security based at least partially on evaluating the one or more market parameters for the security over the optimization period, wherein the correlation value indicates a positive or negative change in price of the security based on values of the one or more market parameters for the security over the optimization period;

determining one or more market parameters for the security and values for the one or more market parameters based at least partially on the determined correlation value;

determining, using a greedy algorithm, a first investment outcome based at least partially on evaluating the determined one or more market parameters for the security and the values over the optimization period;

determining, using the greedy algorithm, a second investment outcome based at least partially on evaluating the determined one or more market parameters for the security and the values over the backtesting period;

determining an investment outcome that is satisfactory based at least partially on a comparison of the first investment outcome to the second investment outcome, wherein the investment outcome is satisfactory when the second investment outcome is, at least, equal to or greater than the first investment outcome;

determine one or more trading decisions for the security based at least partially on the investment strategy.

22. The computer program product of claim 21, further comprising:

implementing the one or more trading decisions for the security, wherein implementing the one or more trade decisions comprising purchasing an investment involving the security during a future period of time when the determined values for the one or more market parameters for the security match market values for the one or more market parameters for the security during a future period of time.

23. The computer program product of claim 21, further comprising:

implementing the one or more trading decisions for the security, wherein implementing the one or more trade decisions comprising selling at least part of an investment involving the security during a future period of time when the determined values for the one or more market parameters for the security do not match market values for the one or more market parameters for the security during a future period of time.

24. The computer program product of claim 23, wherein the selling the at least part of the investment comprises selling the entire investment when the determined values for the one or more market parameters for the security do not match market values for the one or more market parameters for the security during a future period of time.

25. An apparatus comprising:
a computer processing device executing computer readable instruction code structured to cause the computer processing device configured to:
receive information identifying a security;
receive an optimization period for the security, wherein the optimization period comprises a plurality of historical trading days for the security;
receive a backtesting period for the security, wherein the backtesting period comprises a plurality of historical trading days for the security that are different than the plurality of historical trading days associated with the optimization period for the security;
access historical market data for the security, wherein the historical market data includes historical values for a plurality of market parameters for the security over the plurality of historical trading days associated with the optimization period and the backtesting period, wherein the plurality of market parameters are a plurality of forms of market data that can be tracked for the security, and wherein the plurality of market parameters comprises, at least, uniform close, uniform difference, uniform open, daily close, adjusted close, daily high, daily low, gap up, gap down, daily volume, percent volume, and daily percent gain;
determine an investment strategy for the security, wherein determining the investment strategy comprises:
determining a correlation value between at least one market parameter of the plurality of market parameters for the security and a change in price of the security based at least partially on evaluating the at least one market parameter for the security over the optimization period, wherein the correlation value indicates a positive or negative change in price of the security based on values of the at least one market parameter for the security over the optimization period;
selecting one or more market parameters from the plurality of market parameters for the security and values for the at least one market parameter based at least partially on the determined correlation value;
determining, using a greedy algorithm, a first investment outcome based at least partially on evaluating the selected one or more market parameters for the security and the values over the optimization period;
determining, using the greedy algorithm, a second investment outcome based at least partially on evaluating the selected one or more market parameters for the security and the values over the backtesting period;
determining an investment outcome that is satisfactory based at least partially on a comparison of the first investment outcome to the second investment outcome, wherein the investment outcome is satisfactory when the second investment outcome is, at least, equal to or greater than the first investment outcome;
determine one or more trading decisions for the security based at least partially on the investment strategy.

26. The apparatus of claim 1, wherein the historical market data includes historical values for a plurality of market parameters for the security during the historical period of time, and wherein the processor is further configured to:
select a first combination of market parameters from the plurality of market parameters;
determine a first investment strategy that determines trading decisions based at least partially on values of the first combination of market parameters;
test the first investment strategy over a historical period of time and determine a first investment outcome resulting from the test;
select a second combination of market parameters from the plurality of market parameters, wherein the second combination of market parameters is different than the first combination of market parameters;
determine a second investment strategy that determines trading decisions based at least partially on values of the second combination of market parameters;
test the second investment strategy over the historical period of time and determine a second investment outcome resulting from the test; and
select the first combination of market parameters or the second combination of market parameters based at least partially on a comparison between the first investment outcome and the second investment outcome.

27. The apparatus of claim 1, wherein the one or more market parameters comprises at least one of the uniform close, uniform difference, daily close, gap up, or gap down for the security.

28. The method of claim 12, wherein the historical market data includes historical values for a plurality of market parameters for the security during the historical period of time, and wherein the method further comprises:
selecting a first combination of market parameters from the plurality of market parameters;
determining a first investment strategy that determines trading decisions based at least partially on values of the first combination of market parameters;
using a processor to test the first investment strategy over a historical period of time and determine a first investment outcome resulting from the test;
selecting a second combination of market parameters from the plurality of market parameters, wherein the second combination of market parameters is different than the first combination of market parameters;
determining a second investment strategy that determines trading decisions based at least partially on values of the second combination of market parameters;
using a processor to test the second investment strategy over the historical period of time and determine a second investment outcome resulting from the test; and
selecting the first combination of market parameters or the second combination of market parameters based at least partially on a comparison between the first investment outcome and the second investment outcome.

* * * * *